UNITED STATES PATENT OFFICE.

JULIEN DEBY, OF LONDON, COUNTY OF MIDDLESEX, ENGLAND.

PROCESS OF EXTRACTING COPPER AND SILVER FROM THEIR ORES.

SPECIFICATION forming part of Letters Patent No. 252,593, dated January 17, 1882.

Application filed October 5, 1881. (No model.)

*To all whom it may concern:*

Be it known that I, JULIEN DEBY, of the city of London, in the county of Middlesex, England, have invented a new and useful Improvement in the Processes of Extracting Copper and Silver from their Ores, which is fully set forth and described in the following specification.

The object of this invention is the regeneration of the waste ferrous liquors resulting from the decomposition of the copper and silver compounds occurring in their ores by means of solution of ferric sulphate; and it consists in subjecting the said ferrous liquors to the action of the combined fumes of chlorine and sulphurous acid produced and applied after the manner described.

In carrying out this invention the ferrous solution, which may be the result of the treatment of the ore with ferric sulphate, or may be produced by dissolving the crystallized ferrous sulphate in water, is carried to the top of an ordinary condensing-tower. This tower is filled with coke, broken stones, bricks, or other suitable material for dividing the solution above mentioned, which is caused to flow down over them, and make it present an extensive surface. At the bottom of the tower are arranged a muffle-furnace and an ordinary pyrites-burner, so connected with the tower that the gaseous products generated in them may discharge directly into the tower at its lower part.

The muffle-furnace is charged with chlorine-producing mixtures, such as ferrous sulphate and salt, pyrites and salt, or other suitable substances for production of chlorine gas upon the application of heat. The pyrites-burner is charged with pyrites for the generation of sulphurous-acid gas, and when pyrites is wanting any other suitable substance may be employed as a substitute. The discharge of the chlorine and sulphurous-acid gases into the condensing-tower is so regulated that they may each enter it in about the proportions necessary to the execution of the following reaction: $2FeSO_4 + 2H_2O + 4Cl + SO_2 = Fe_2(SO_4)_3 + 4HCl$. By this means the ferrous sulphate is changed to ferric sulphate, which alone of the two sulphates has the power of decomposing the compounds of copper and silver, as above mentioned. The chlorine, by its decomposing action upon the moisture present, aids indirectly in the more ready oxidation of the sulphurous acid in contact with the iron salt, and consequently in the more rapid regeneration desired. Other oxidizing agents could be employed as substitutes in this connection; but chlorine is cheaper and more easily applied. The solution thus obtained is then employed in the lixiviation of the ores of the metals in question, and the metals are extracted from the ferrous solutions after the usual methods by precipitation upon copper and iron.

By the combination of this method of regeneration, involving the use for the most part of materials always at hand in localities where it must be applied, with the process of lixiviation of ores of copper and silver with solution of ferric sulphate, the execution of the latter is rendered much more economical, and therefore practical.

I am aware that ferric-sulphate solution has been employed, either alone or in combination with other methods of regeneration, for reduction of copper and silver ores: but these differ essentially from the combination described in the foregoing specification.

What I claim as my invention, therefore, and desire to secure by Letters Patent of the United States, is—

1. The process of extracting copper and silver from their ores, which consists in lixiviating the ore with a solution of ferric sulphate and regenerating the resulting waste ferrous liquors by means of the concerted and combined action of chlorine and sulphurous-acid gases, for reuse, all in the manner and for the purposes substantially as described.

2. The process of converting ferrous sulphate to ferric sulphate, which consists in subjecting the solution of ferrous sulphate to the combined action of chlorine and sulphurous-acid gases, substantially as described.

JULIEN DEBY.

Witnesses:
COLIN CAMPBELL BROWN,
WILLIAM N. REID.